(12) United States Patent
Kozuka et al.

(10) Patent No.: US 12,163,858 B2
(45) Date of Patent: Dec. 10, 2024

(54) MISFIRE DETERMINATION DEVICE FOR INTERNAL COMBUSTION ENGINE

(71) Applicant: HONDA MOTOR CO., LTD., Tokyo (JP)

(72) Inventors: Satoshi Kozuka, Tokyo (JP); Jun Iida, Tokyo (JP); Nobukazu Asano, Tokyo (JP); Hayato Watanabe, Tokyo (JP); Naoyuki Tanaka, Tokyo (JP); Bumpei Nakayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/335,273

(22) Filed: Jun. 15, 2023

(65) Prior Publication Data

US 2023/0408374 A1    Dec. 21, 2023

(30) Foreign Application Priority Data

Jun. 20, 2022  (JP) ................................. 2022-098668

(51) Int. Cl.
  *G01M 15/11*    (2006.01)
(52) U.S. Cl.
  CPC ................... *G01M 15/11* (2013.01)
(58) Field of Classification Search
  CPC ................................................. G01M 15/11
  See application file for complete search history.

(56) References Cited

U.S. PATENT DOCUMENTS

| 5,241,480 A | * | 8/1993 | Takaku | G01M 15/11 |
| | | | | 123/436 |
| 2003/0034009 A1 | * | 2/2003 | Yuya | F02D 41/0087 |
| | | | | 123/436 |
| 2004/0250803 A1 | * | 12/2004 | Kitamura | F02M 26/47 |
| | | | | 123/568.31 |
| 2007/0157713 A1 | | 7/2007 | Tsukamato et al. | |
| 2012/0330535 A1 | * | 12/2012 | Tsuji | F02N 11/0814 |
| | | | | 701/104 |
| 2023/0400002 A1 | * | 12/2023 | Watanabe | F02P 5/1521 |
| 2024/0110848 A1 | * | 4/2024 | Asano | G01M 15/05 |

FOREIGN PATENT DOCUMENTS

JP    2007-198368 A    8/2007

\* cited by examiner

*Primary Examiner* — John Kwon
(74) *Attorney, Agent, or Firm* — Carter, DeLuca & Farrell LLP

(57) ABSTRACT

A misfire determination device, for an internal combustion engine, according to the present invention detects a combustion state parameter of the internal combustion engine, retrieves an extreme value of the combustion state parameter in an extreme value retrieval section from a start timing of a combustion stroke to a predetermined crank angle (step 5), upon retrieval of the extreme value, sets a predetermined crank angle section subsequent to a crank angle corresponding to the extreme value as a misfire determination parameter calculation section (step 6, expression 5), calculates a misfire determination parameter based on the combustion state parameter that has been detected in the misfire determination parameter calculation section (step 6), and determines a misfire based on the misfire determination parameter (steps 7 to 9).

3 Claims, 6 Drawing Sheets

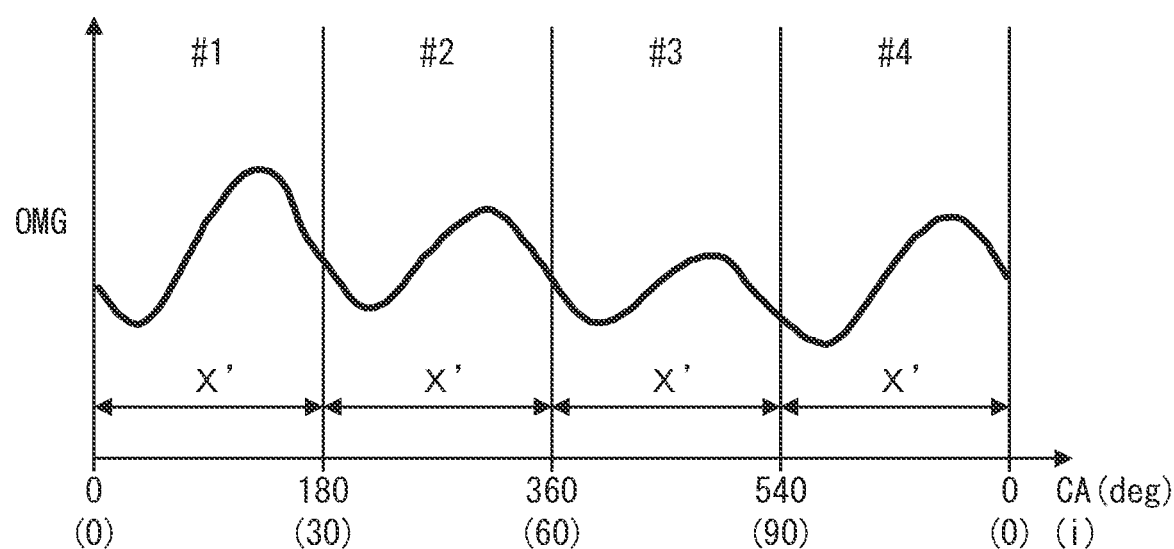

MISFIRE DETERMINATION DEVICE FOR INTERNAL COMBUSTION ENGINE

BACKGROUND

Technical Field

The present invention relates to a misfire determination device for an internal combustion engine, and the misfire determination device determines presence or absence of a misfire, based on a rotational speed parameter that represents a rotational speed of the internal combustion engine.

Related Art

As a conventional misfire determination device for an internal combustion engine, for example, a device disclosed in JP 2007-198368 A is known. In this misfire determination device, a rotational speed of the internal combustion engine is detected at every predetermined crank angle (for example, six degrees), filter processing or the like is applied, and then a difference between the rotational speed and a reference rotational speed (the rotational speed in the compression TDC of the cylinder) is calculated as a relative rotational speed. Then, a misfire determination parameter is calculated by integrating the relative rotational speed that has been calculated over the entire combustion stroke, and in addition, in a case where the misfire determination parameter is smaller than a predetermined threshold value, it is determined that the misfire is occurring in the cylinder.

CITATION LIST

Patent Literature

Patent Literature 1: JP 2007-198368 A

SUMMARY

In the conventional misfire determination device described above, however, there is a problem that the misfire cannot be accurately determined because of the following reason, when an ignition timing is controlled to a retard angle side or the like. That is to say, in a case where the ignition timing is set to an optimum ignition timing, ignition is conducted in the vicinity of the compression top dead center and combustion is started. Hence, as illustrated in FIG. 5A, the rotational speed waveform rises from the vicinity of the compression top dead center (TDC). On the other hand, in a case where the ignition timing is controlled to the retard angle side in order to suppress knocking or to promote warm-up of the catalyst, the actual combustion start timing is delayed accordingly, and as a result, the phase of the rotational speed waveform is shifted to the retard angle side as compared with the case of the optimum ignition timing as illustrated in FIG. 5B.

Even in a case where the phase of the rotational speed waveform is shifted to the retard angle side as described above, in the conventional misfire determination device, as illustrated in FIG. 6, the misfire determination parameter is calculated with the entire combustion stroke as a misfire determination parameter calculation section X'. For this reason, the misfire determination parameter includes the rotational speed before the combustion of this time is started. Hence, it is not possible to appropriately extract only a combustion component caused by the combustion of this time. Even when the combustion is normally conducted, the misfire determination parameter is calculated to be smaller. As a result, it is not possible to appropriately make a misfire determination based on a comparison result between the misfire determination parameter and a threshold value, and its accuracy will decrease.

In order to eliminate such a drawback, for example, it is conceivable to prepare a table that represents a relationship between an ignition timing and an offset amount in the parameter calculation section (an offset amount from the compression top dead center at the beginning in a calculation section of the misfire determination parameter), and in addition, to retrieve the offset amount from this table in accordance with an actual ignition timing that has been set and determine the calculation section of the misfire determination parameter. However, in such a case, a large amount of man-hours is needed in an experiment or the like for creating the table, thereby leading to an increase in cost. In addition, it is not possible to handle factors other than the ignition timing that affects the phase shift of the rotational speed waveform (for example, a difference in combustion characteristic of the fuel or a variation between cylinders).

The present invention has been made to address the above issues, and has an object to provide a misfire determination device for an internal combustion engine, and the misfire determination device is capable of calculating a misfire determination parameter on which a combustion state is favorably reflected, based on a detected combustion state of the internal combustion engine without a table or a map prepared beforehand, even in a case where the ignition timing is controlled to a retard angle side, and accordingly improving the accuracy of misfire determination.

In order to achieve such an object, a misfire determination device for an internal combustion engine is provided according to a first aspect of the present invention, and the misfire determination device includes: a combustion state parameter detection unit (crank angle position sensor 13, ECU 2) configured to detect a combustion state parameter (relative rotational speed OMGREF in one embodiment (hereinafter, the same will apply in the present paragraph)) that represents a combustion state of the internal combustion engine 3; an extreme value retrieval unit (ECU 2, step 5 in FIG. 3) configured to retrieve an extreme value of the combustion state parameter in an extreme value retrieval section Y from a start timing of a combustion stroke to a predetermined crank angle; a parameter calculation section setting unit (ECU 2, step 6 expression 5) configured to set, upon retrieval of the extreme value, a predetermined crank angle section subsequent to a crank angle corresponding to the extreme value, as a misfire determination parameter calculation section X; a misfire determination parameter calculation unit (ECU 2, step 6) configured to calculate a misfire determination parameter MFJUD, based on the combustion state parameter that has been detected in the misfire determination parameter calculation section X; and a misfire determination unit (ECU 2, steps 7 to 9) configured to determine a misfire, based on the misfire determination parameter MFJUD that has been calculated.

In such a misfire determination device, the combustion state parameter that represents the combustion state of the internal combustion engine is detected. In addition, in the extreme value retrieval section from the start timing of the combustion stroke to the predetermined crank angle, the presence of absence of an extreme value of the combustion state parameter is retrieved. In a case where the extreme value is retrieved, the predetermined crank angle section subsequent to the crank angle corresponding to the extreme value is set as the misfire determination parameter calculation section, and in addition, the misfire determination parameter is calculated, based on the combustion state parameter that has been detected in the misfire determination parameter calculation section. Then, a misfire is determined, based on the misfire determination parameter that has been calculated.

As described above, the predetermined crank angle section subsequent to the crank angle corresponding to the extreme value of the combustion state parameter is set as the misfire determination parameter calculation section. Therefore, the misfire determination parameter that has been calculated does not include the combustion state before the combustion of this time is started. Only a combustion component caused by the combustion of this time is appropriately extracted, and the combustion state is favorably reflected. Then, the misfire can be accurately determined, based on the misfire determination parameter that has been calculated as described above.

As described above, according to the present invention, even in a case where the ignition timing is controlled to the retard angle side, no table or map is prepared beforehand unlike the conventional case, and the misfire determination parameter on which the combustion state is favorably reflected can be calculated, based on the detected rotational speed of the internal combustion engine. Accordingly, the accuracy of misfire determination can be improved.

According to a second aspect of the present invention, in the misfire determination device for the internal combustion engine described in the first aspect, the extreme value retrieval section Y is set to correspond to a maximum value of a phase delay amount of a waveform of the combustion state parameter that is likely to occur in accordance with control of an ignition timing to a retard angle side.

According to this configuration, the extreme value retrieval section is set as described above. Therefore, when the phase delay of the combustion state parameter occurs in accordance with the control of the ignition timing to the retard angle side, the extreme value of the combustion state parameter is present in the extreme value retrieval section, and is thus retrieved with certainty. Therefore, the misfire determination parameter calculation section can be set with certainty, based on the extreme value that has been retrieved.

According to a third aspect of the present invention, in the misfire determination device for the internal combustion engine described in the first or second aspect, the combustion state parameter is a rotational speed parameter (relative rotational speed OMGREF) that represents a rotational speed of the internal combustion engine 3.

The rotational speed of the internal combustion engine favorably reflects the combustion state of the internal combustion engine. For example, the rotational speed increases in a case where the combustion has been normally performed, and decreases in a case where the misfire has occurred. Therefore, according to this configuration, the above-described actions in the first or second aspect are favorably obtainable by use of the rotational speed parameter that represents the rotational speed of the internal combustion engine, as the combustion state parameter.

BRIEF DESCRIPTION OF DRAWINGS

FIG. 6 is a diagram for describing an operation example obtained by conventional misfire determination.

DETAILED DESCRIPTION

Figure 1:
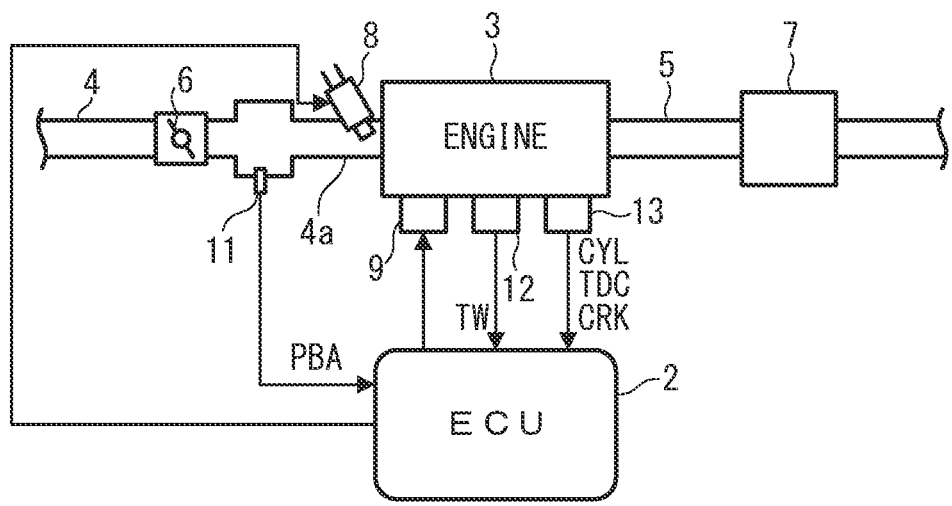
FIG. 1 is a diagram schematically illustrating an internal combustion engine and a misfire determination device to which the present invention is applied.

Hereinafter, preferred embodiments of the present invention will be described in detail with reference to the drawings. An internal combustion engine (hereinafter, referred to as "engine") 3 illustrated in FIG. 1 is mounted as a power source in, for example, a vehicle (not illustrated), and includes a plurality of (for example, four) cylinders (not illustrated). An intake pipe 4, through which air (fresh air) flows, and an exhaust pipe 5, through which exhaust gas flows, are connected with the engine 3. The intake pipe 4 is provided with a throttle valve 6 for adjusting the amount of intake air into the engine 3, and the exhaust pipe 5 is provided with a catalyst converter 7 for purifying the exhaust gas.

A fuel injection valve 8 for injecting fuel is provided for every cylinder, in an intake manifold 4a, which is connected with the intake pipe 4. A valve opening time of the fuel injection valve 8 is controlled by a control signal from an electronic control unit (ECU) 2 to be described later, and thus a fuel injection amount of each cylinder is controlled. In the engine 3, an ignition plug 9 for igniting the air-fuel mixture in a combustion chamber is provided for every cylinder. The ignition timing of the ignition plug 9 is controlled by a control signal from the ECU 2.

In addition, an intake pressure sensor 11 for detecting pressure (intake pressure) PBA in the intake pipe 4 is provided on an immediately downstream side of the throttle valve 6 of the intake pipe 4, and the engine 3 is provided with a water temperature sensor 12 for detecting a cooling water temperature (engine water temperature) TW of the intake pipe 4. These detection signals are output to the ECU 2.

Furthermore, a crank shaft (not illustrated) of the engine 3 is provided with a crank angle position sensor 13 for detecting a rotation angle of the crank shaft. The crank angle position sensor 13 includes a magnet rotor and an MRE pickup, and outputs a CYL signal, a TDC signal, and a CRK signal, which are pulse signals, to the ECU 2 in accordance with the rotation of the crankshaft.

The CYL signal is for distinguishing among cylinders of the engine 3, and is output at a predetermined crank angle position of a specific cylinder. The TDC signal is output at a timing when the piston (not illustrated) is located at a predetermined crank angle position slightly before reaching the top dead center of the start timing of the intake stroke in any of the cylinders. In addition, the CRK signal is output at every constant crank angle (for example, six degrees) shorter than the TDC signal.

The CYL signal, the TDC signal, and the CRK signal are used for timing control of fuel injection timing, ignition timing, and the like in each cylinder and for detection of an engine speed NE. As will be described later, in the present embodiment, in particular, a misfire of the engine 3 is determined, based on a generation time interval (hereinafter, referred to as a "time parameter") CRME of the CRK signal.

The ECU 2 includes a microcomputer including a CPU, a RAM, a ROM, an input and output interface (none of which is illustrated), and the like. The above RAM includes a buffer memory for storing a large number of time parameters CRME and the like.

The ECU 2 conducts engine control including intake air amount control via the throttle valve 6, fuel injection control via the fuel injection valve 8, and ignition timing control via the ignition plug 9 in accordance with a control program stored in the ROM. In the present embodiment, in particular, misfire determination processing of determining a misfire of the engine 3 for every cylinder is conducted, based on the time parameter CRME. In the present embodiment, a combustion state parameter detection unit, an extreme value retrieval unit, a parameter calculation section setting unit, a misfire determination parameter calculation unit, and a misfire determination unit are configured with the ECU 2.

Figure 2A:
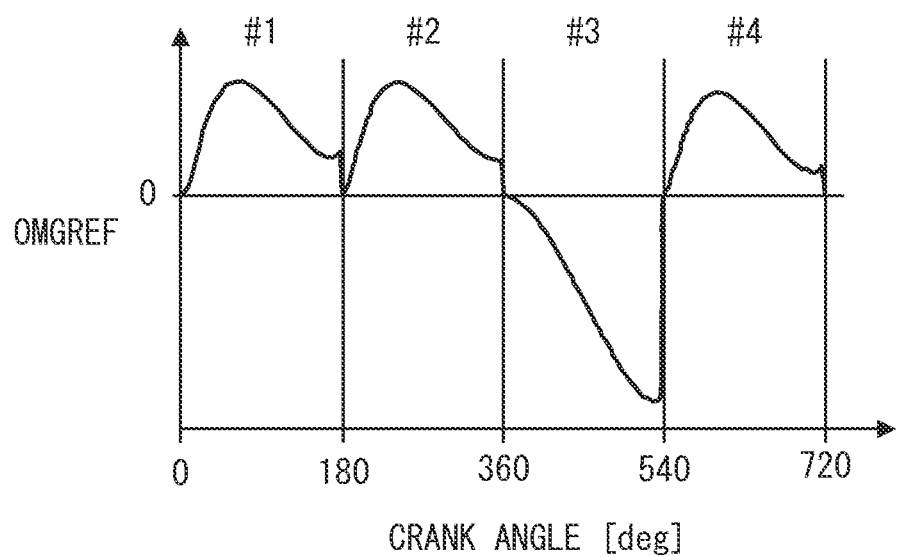
FIGS. 2A and 2B are each a diagram for describing a method for determining a misfire for every ignition.

Next, a misfire determination method in the present embodiment will be described with reference to FIGS. 2A and 2B. FIG. 2A illustrates transitions of a relative rotational speed OMGREF with the rotational speed detected in the vicinity of the compression top dead center of each cylinder of the engine 3 as a reference (hereinafter, referred to as "reference rotational speed"). The relative rotational speed OMGREF is calculated by subtracting the reference rotational speed from a rotational speed detected (calculated from the time parameter CRME) at every crank angle of six degrees that is a generation interval of the CRK signal. To identify four cylinders, #1 to #4 in FIG. 2A are cylinder identification numbers that have been assigned in an ignition order.

From the above definition, in the combustion stroke after reaching the compression top dead center, the relative rotational speed OMGREF becomes a smaller value in a case where a misfire has occurred than a value in a case where ignition is normally conducted. That is, in the example of FIG. 2A, it is estimated that combustion is normally conducted in #1, #2, and #4 cylinders, and the misfire occurs in #3 cylinder.

Figure 2B:
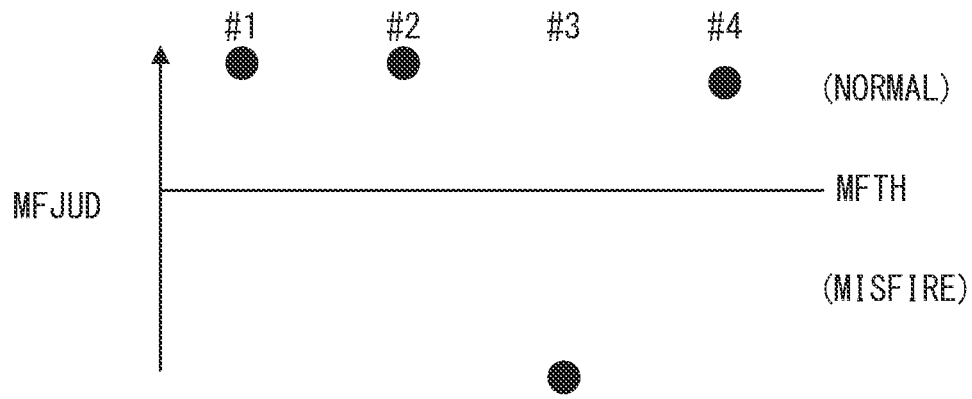

Therefore, regarding an integrated value (hereinafter, referred to as a "misfire determination parameter") obtained by integrating the relative rotational speed OMGREF calculated at every crank angle of six degrees in the combustion stroke, it is smaller than a predetermined threshold MFTH in #3 cylinder in which the misfire has occurred, and is larger than the threshold MFTH in #1, #2, and #4 cylinders in which combustion has been normally conducted, as illustrated in FIG. 2B. From the foregoing, it becomes possible to determine a misfire for every cylinder by use of the misfire determination parameter.

Figure 3:
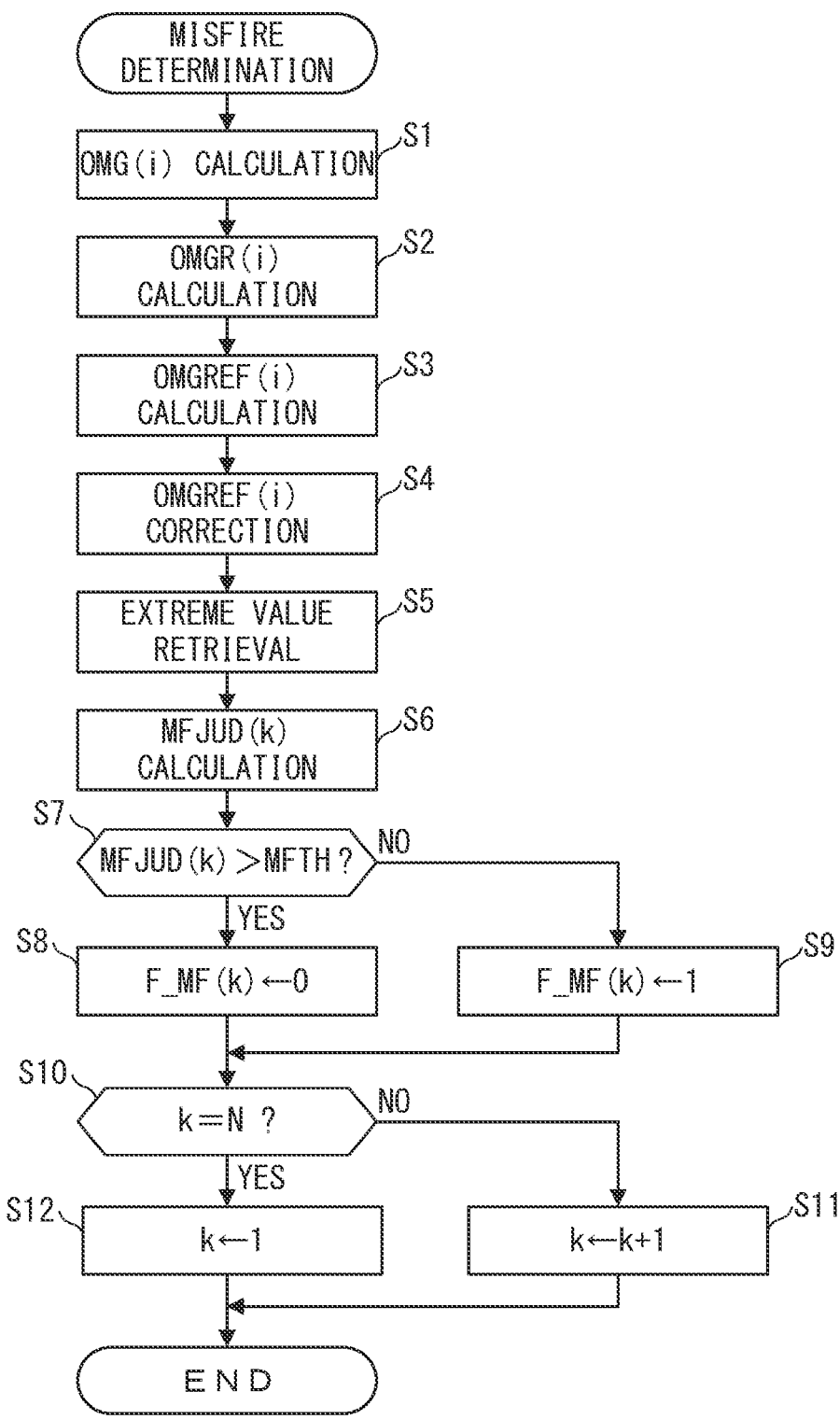
FIG. 3 is a flowchart illustrating misfire determination processing.

FIG. 3 is a flowchart of misfire determination processing using the above-described method. This processing is performed by the ECU 2 in synchronization with the generation of the TDC signal. Note that regarding a time parameter CRME(i), which is a time interval of the CRK signal to be generated at every crank angle of six degrees, data for the crank angle of 720 degrees (a data identification number i=0 to ND−1, the number of data ND=120) is stored in the buffer memory in the RAM. This similarly applies to other parameters, to be described later, to be calculated at every crank angle of six degrees, and to be assigned with the data identification number i.

In addition, in a case where k (1 to 4) represents a cylinder identification number in the ignition order and NTDC represents the number of data for one TDC period (NTDC=30 in the present embodiment), an arithmetic operation is performed from the data identification number i (k−1)·NTDC to (k·NTDC−1) while the present processing is being performed once. For example, in a case where the processing of this time is performed for #1 cylinder (k=1), the data identification number i takes a value from 0 to (NTDC−1) (=29), and in a case where the processing of this time is performed for #4 cylinder (k=4), the data identification number i takes a value from 3 NTDC (=90) to (4NTDC−1) (=119).

In the processing of FIG. 3, first, in step 1 (illustrated as "S1", hereinafter, the same will apply), the time parameter CRME(i) is converted into a rotational speed OMG(i) (rad/s) by the following expression 1.

[Expression 1]

$$OMG(i)=D\theta/CRME(i) \quad (1)$$

Here, $D\theta$ represents an angular interval $4\alpha/ND$ for measuring the time parameter CRME, and is $\pi/30$ (rad) in the present embodiment.

Next, in step 2, 720-degree filter processing is performed for the rotational speed OMG in accordance with the following expression 2 to calculate a rotational speed OMGR(i) that has been subjected to the filter processing.

[Expression 2]

$$OMGR(i)=OMG(i)-(OMG(ND)-OMG(0))\times D\theta \times i/4\pi \quad (2)$$

Such 720-degree filtering processing is a process of canceling a linear change part in a period of one cycle (crank angle of 720 degrees) and extracting a variation of a relatively short cycle.

Next, in step 3, a relative rotational speed OMGREF(i) is calculated by the following expression 3.

[Expression 3]

$$OMGREF(i)=OMGR(i)-OMGR((k-1)NTDC) \quad (3)$$

Here, OMGR((k−1)NTDC) is a reference rotational speed, and corresponds to the rotational speed OMGR that has been subjected to the filter processing at the compression top dead center of the cylinder that is a misfire determination target.

Next, in step 4, correction processing of the relative rotational speed OMGREF(i) is performed. This correction includes, for example, a correction for compensating for an inertial force rotational speed component caused by inertial force of a movable part of the engine 3.

Figure 4:
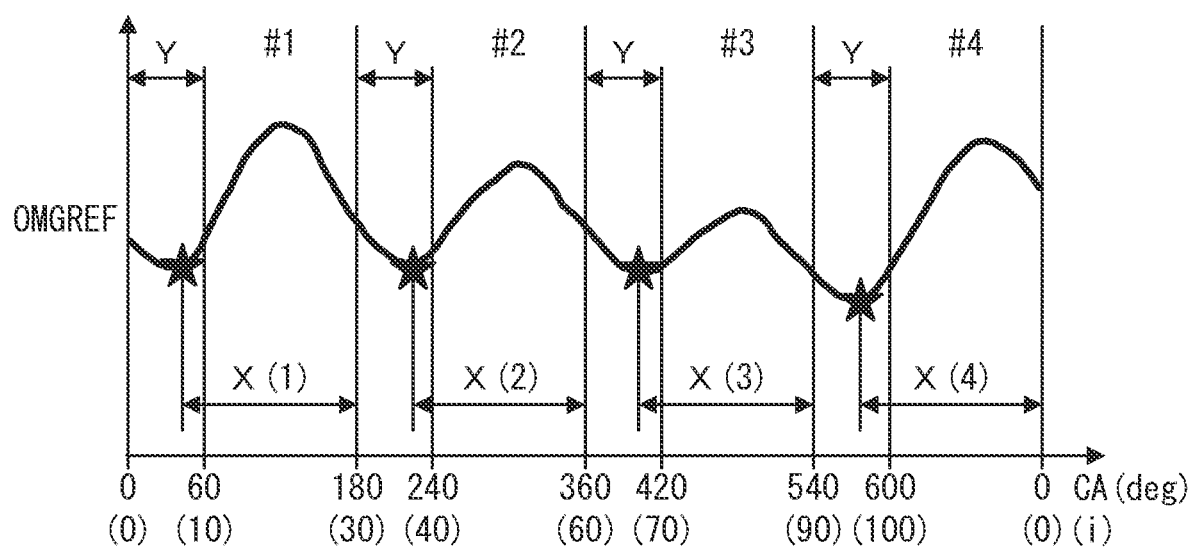
FIG. 4 is a diagram for describing an operation obtained by the misfire determination processing.
Figure 5A:
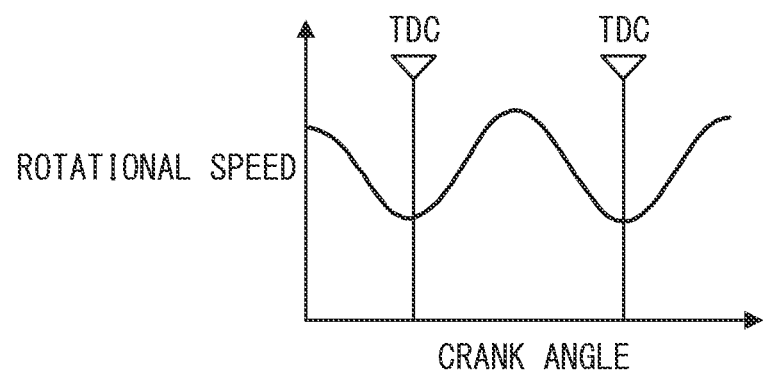
FIGS. 5A and 5B are each a diagram for describing a phase shift of a rotational speed waveform in accordance with an ignition timing.
Figure 5B:
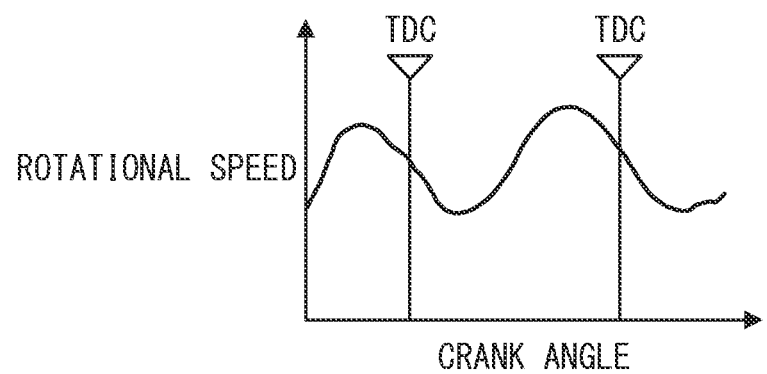

Next, in step 5, an extreme value of the relative rotational speed OMGREF is retrieved. As illustrated in FIG. 4, the extreme value is retrieved in an extreme value retrieval section Y from the compression top dead center (from the start timing of the combustion stroke) to a predetermined crank angle. Such an extreme value retrieval section Y is set to, for example, a section of 60 degrees from the start timing of the combustion stroke so as to correspond to a maximum value of a phase delay amount of the rotational speed waveform that is likely to occur in accordance with control of the ignition timing to the retard angle side.

In addition, the extreme value is retrieved as follows, for example. First, a difference between the relative rotational speed OMGREF(i) obtained in the extreme value retrieval section Y and its previous value OMGREF(i−1) is calculated as a relative rotational speed change amount $\Delta$OMGREF(i). Then, in a case where a relationship of $\Delta$OMGREF(i)<0 and $\Delta$OMGREF(i+1)≥0 is established, the relative rotational speed OMGREF(i) of this time is retrieved as an extreme value, and in addition, the data identification number i of this time is set as an extreme value corresponding number NP.

On the other hand, in a case where the relative rotational speed OMGREF that satisfies the above relationship cannot be found in the extreme value retrieval section Y, it is considered that such an extreme value has not been retrieved.

Next, in step 6, the relative rotational speed OMGREF is integrated, and is calculated as a misfire determination parameter MFJUD(k). Specifically, in a case where the extreme value of the relative rotational speed OMGREF has been retrieved, the relative rotational speed OMGREF(i) is firstly calculated by the following expression 4 by use of the above-described extreme value corresponding number NP. As is apparent from the comparison with the expression 3, instead of the rotational speed OMGR((k−1)NTDC) at the compression top dead center, a rotational speed OMGR(NP) at a crank angle corresponding to the extreme value is used as the reference rotational speed in the expression 4, and the relative rotational speed OMGREF is calculated again.

[Expression 4]

$$OMGREF(i) = OMGR(i) - OMGR(NP) \quad (4)$$

Next, after a correction is added to the relative rotational speed OMGREF that has been calculated, the misfire determination parameter MFJUD(k) is calculated by the following expression 5.

[Expression 5]

$$MFJUD(k) = \sum_{i=NP}^{kNTDC-1} OMGREF(i) \quad (5)$$

As indicated by the expression 5 and FIG. 4, in a case where the extreme value has been retrieved, a crank angle section from the crank angle corresponding to the extreme value to an end timing of the combustion stroke is set as a misfire determination parameter calculation section X(k), and in addition, the misfire determination parameter MFJUD(k) is calculated by integrating the relative rotational speed OMGREF that has been obtained by the expression 4 or the like in the misfire determination parameter calculation section X(k).

In addition, in a case where the extreme value of the relative rotational speed OMGREF has not been retrieved, the misfire determination parameter MFJUD(k) is calculated by the following expression 6.

[Expression 6]

$$MFJUD(k) = \sum_{i=(k-1)NTDC}^{kNTDC-1} OMGREF(i) \quad (6)$$

As indicated by the expression 6, in this case, the entire combustion stroke becomes the misfire determination parameter calculation section, and the misfire determination parameter MFJUD(k) is calculated by integrating the relative rotational speed OMGREF that has been obtained by the expression 3 or the like in the combustion stroke.

Next, in step 7, it is determined whether the misfire determination parameter MFJUD(k) is larger than a predetermined threshold value MFTH. In a case where the answer is YES and MFJUD(k)>MFTH, it is determined that the combustion has been normally conducted in the cylinder (#k cylinder) that is a determination target of this time, and a misfire flag F_MF(k) is set to "0" (step 8). On the other hand, in a case where the answer to step 7 is NO and MFJUD(k) ≤MFTH, it is determined that a single misfire has occurred in #k cylinder, and the misfire flag F_MF(k) is set to "1" (step 9).

In step 10 subsequent to step 8 or step 9, it is determined whether the cylinder identification number k of this time is equal to the number of cylinders N. In a case where the answer is NO, the cylinder identification number k is incremented by "1" (step 11), and in a case where k=N, the cylinder identification number k is returned to "1" (step 12), and then the present processing ends.

As described heretofore, according to the present embodiment, the extreme value of the relative rotational speed OMGREF is retrieved, and the crank angle section from the crank angle corresponding to the extreme value that has been retrieved to the end timing of the combustion stroke is set as the misfire determination parameter calculation section X. Accordingly, the misfire determination parameter MFJUD that has been calculated in the misfire determination parameter calculation section X does not include the rotational speed before the combustion of this time is started. Only the combustion component caused by the combustion of this time is appropriately extracted, and the combustion state is favorably reflected.

Therefore, even in a case where the ignition timing is controlled to the retard angle side, no table or map is prepared beforehand unlike the conventional case, the misfire determination parameter MFJUD on which the combustion state is favorably reflected can be calculated, based on the detected rotational speed of the engine 3. Accordingly, the accuracy in the misfire determination can be improved.

In addition, the extreme value retrieval section Y, from which the extreme value of the relative rotational speed OMGREF is retrieved, is set to correspond to the maximum value of the phase delay amount of the rotational speed waveform that is likely to occur in accordance with control of the ignition timing to the retard angle side. Accordingly, in a case where the phase delay of the rotational speed parameter occurs in accordance with the control of the ignition timing to the retard angle side, the extreme value of the relative rotational speed OMGREF can be retrieved with certainty, and the misfire determination parameter calculation section based on the extreme value that has been retrieved can be set with certainty.

Note that the present invention is not limited to the embodiments that have been described, and can be implemented in various aspects. For example, in one embodiment, the relative rotational speed OMGREF, which is one of the rotational speed parameters, is used as the combustion state parameter. The present invention is not limited to this, and it is possible to use, as the combustion state parameter, another appropriate parameter that favorably represents the combustion state of the internal combustion engine. For example, a cylinder internal pressure sensor may be provided in a cylinder, and cylinder internal pressure that has been detected by the cylinder internal pressure sensor may be used as the combustion state parameter.

In addition, in one embodiment, the misfire determination parameter calculation section X is set to a section from the crank angle corresponding to the extreme value of the relative rotational speed OMGREF that has been retrieved to the end timing of the combustion stroke. The present invention is not limited to this, and for example, the end timing of the misfire determination parameter calculation section X may be extended to the crank angle corresponding to the extreme value that has been retrieved in the next combustion stroke.

Further, in one embodiment, the extreme value retrieval section Y is set to a section from the start timing of the combustion stroke to the crank angle of 60 degrees, but may be changed as appropriate in accordance with the maximum value of the phase delay amount of the rotational speed waveform that is likely to occur in accordance with control of the ignition timing to the retard angle side.

Furthermore, the method for retrieving the extreme value of the relative rotational speed OMGREF that has been described in one embodiment is merely an example, and another appropriate retrieving method is adoptable. In addition, in one embodiment, the relative rotational speed OMGREF is mainly used as the rotational speed parameter of the internal combustion engine. However, another rotational speed parameter such as the time parameter CRME or the rotational speed OMG may be used as appropriate. In addition, the detailed configuration can be changed as appropriate within the scope of the gist of the present invention.

What is claimed is:

1. A misfire determination device for an internal combustion engine, the misfire determination device comprising:
   a combustion state parameter detection unit configured to detect a combustion state parameter that represents a combustion state of the internal combustion engine;
   an extreme value retrieval unit configured to retrieve an extreme value of the combustion state parameter in an extreme value retrieval section from a start timing of a combustion stroke to a predetermined crank angle;
   a parameter calculation section setting unit configured to set, upon retrieval of the extreme value, a predetermined crank angle section subsequent to a crank angle corresponding to the extreme value, as a misfire determination parameter calculation section;
   a misfire determination parameter calculation unit configured to calculate a misfire determination parameter, based on the combustion state parameter that has been detected in the misfire determination parameter calculation section; and
   a misfire determination unit configured to determine a misfire, based on the misfire determination parameter that has been calculated, and
   wherein the extreme value retrieval section is set to correspond to a maximum value of a phase delay amount of a waveform of the combustion state parameter that occurs in accordance with control of an ignition timing to a retard angle side.

2. The misfire determination device for the internal combustion engine according to claim 1, wherein the combustion state parameter is a rotational speed parameter that represents a rotational speed of the internal combustion engine.

3. The misfire determination device for the internal combustion engine according to claim 1, wherein in a case where the extreme value of the combustion state parameter has not been retrieved, the entire combustion stroke is set as the misfire determination parameter calculation section.

* * * * *